June 17, 1941. G. JAECKEL 2,246,098
LENS AND THE MANUFACTURE THEREOF
Filed Sept. 8, 1939 5 Sheets-Sheet 1

Inventor
GEORG JAECKEL,
By Bailey & Carver
Attorney

June 17, 1941. G. JAECKEL 2,246,098
LENS AND THE MANUFACTURE THEREOF
Filed Sept. 8, 1939 5 Sheets-Sheet 2

Inventor
GEORG JAECKEL,
By Bailey & Pearson
Attorney

June 17, 1941.                G. JAECKEL                2,246,098
                LENS AND THE MANUFACTURE THEREOF
                    Filed Sept. 8, 1939          5 Sheets-Sheet 3
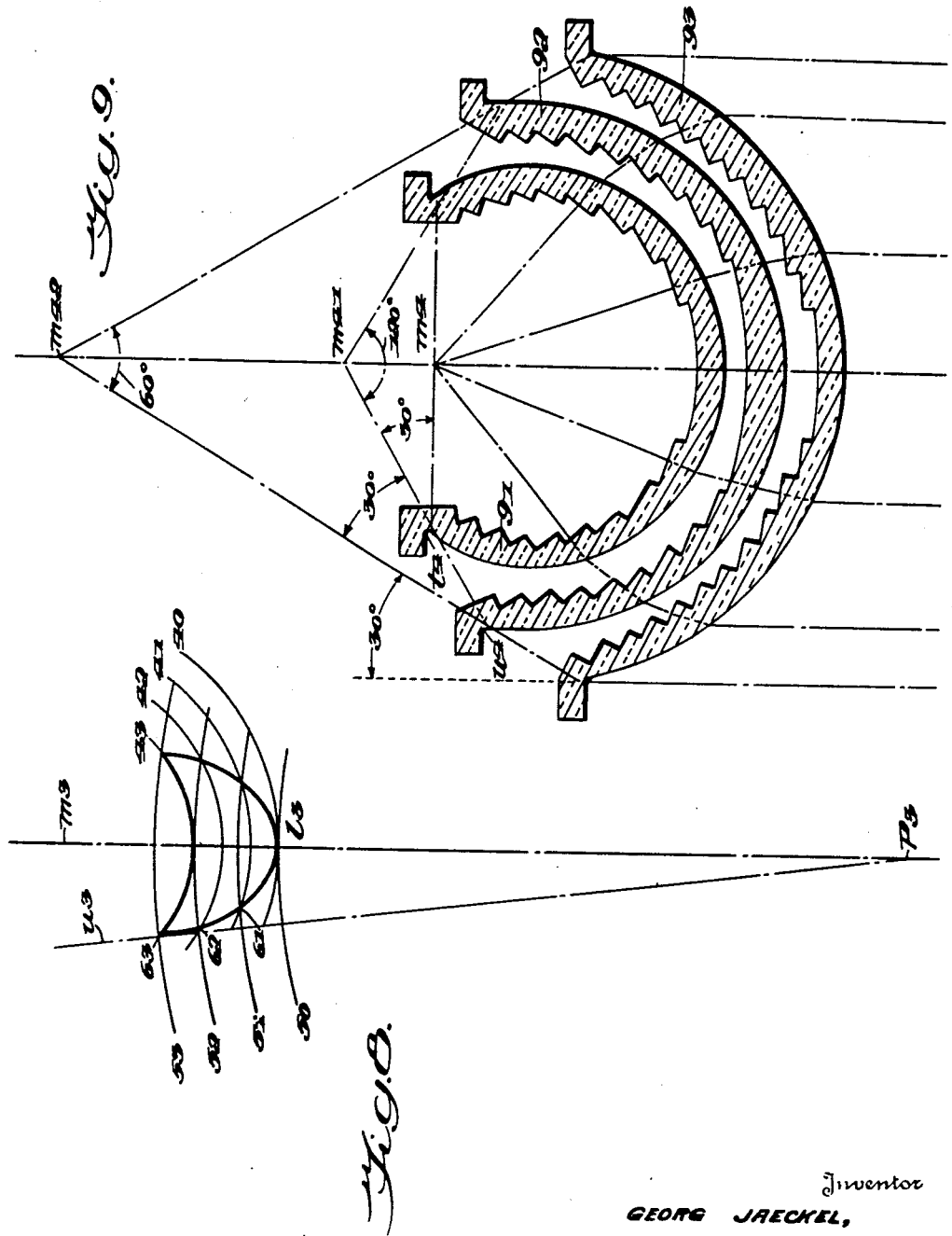
Inventor
GEORG JAECKEL, June 17, 1941.   G. JAECKEL   2,246,098
LENS AND THE MANUFACTURE THEREOF
Filed Sept. 8, 1939   5 Sheets-Sheet 4

Inventor
GEORG JAECKEL,
By Bailey & Brown
Attorney

June 17, 1941.　　　G. JAECKEL　　　2,246,098
LENS AND THE MANUFACTURE THEREOF
Filed Sept. 8, 1939　　　5 Sheets-Sheet 5
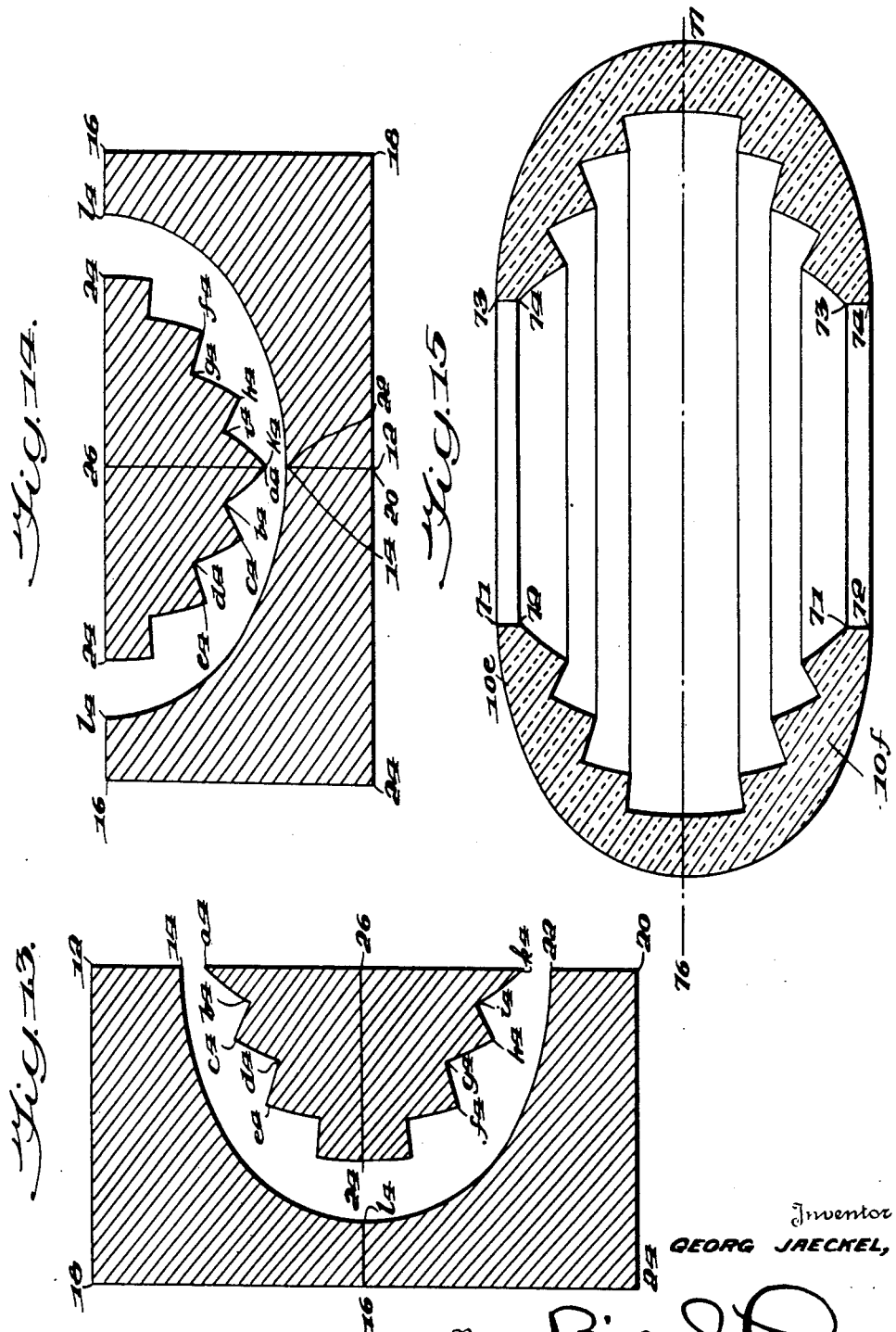
Inventor
GEORG JAECKEL,
By Barley & Carson
Attorney Patented June 17, 1941

2,246,098

UNITED STATES PATENT OFFICE 2,246,098

LENS AND THE MANUFACTURE THEREOF

Georg Jaeckel, Berlin-Lichterfelde, Germany, assignor to the firm Sendlinger Optische Glaswerke G. m. b. H., Berlin-Zehlendorf, Germany Application September 8, 1939, Serial No. 294,031
In Germany March 20, 1936

10 Claims. (Cl. 240—106.1)

The invention relates to lenses and to the manufacture thereof.

A primary object of the invention is to produce a stepped lens of the Fresnel type from pressed glass which is designed to prevent the loss of light passing through the lens.

A further object of the invention is the provision of a lens in which only one of the surfaces need be calculated, while the other surface can be treated as if the lens were solid up to the focal point or light source.

Still another object of the invention is to provide a system of stepped lenses capable of receiving light from a source through a range of 180°, and bending this light into parallel beams, while limiting the amount of refraction produced by any individual lens to an angle of not more than 30°.

Further objects and advantages of the invention will appear more fully from the following description, particularly when taken in conjunction with the accompanying drawings, which form a part thereof.

In the drawings:

Fig. 8 is a diagram showing the compilation of the convex surface of a lens of the type shown in Fig. 7;

Fig. 9 shows a lens system for deflecting light through a range of 180°;

Fig. 13 shows in cross section the production of a mold for making a lens according to the invention;

Fig. 14 shows in cross section the same mold in assembled position for pressing out a lens;

Fig. 15 shows a modified form of lens embodying the invention with its method of production.

Figure 1:
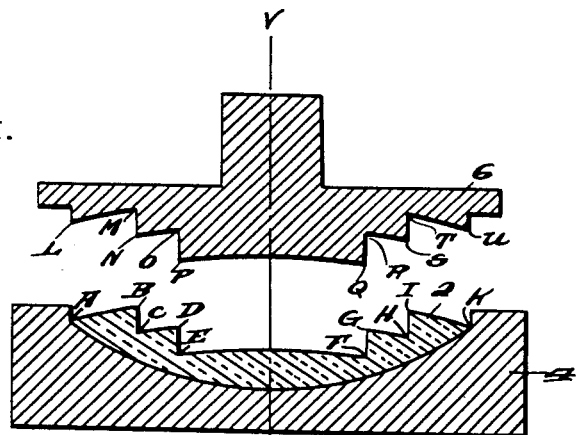
Fig. 1 shows the procedure ordinarily used in manufacturing a stepped lens.

The usual type of stepped lens 2 as shown in Fig. 1 has a series of steps such as AB, CD, EF, GH, IK connected by surfaces BC, DE, GF and IH. The lower surface may have any desired shape but is usually a smooth convex curve. The lens is produced by pressing in a mold 4, the plunger 6 which has steps LM, NO, PQ, RS and TU connected by surfaces MN, OP, RQ and TS. Obviously in the production of a lens in this manner the step connecting surfaces, such as BC, must be either parallel to the axis VW of the lens 2, this line VW also indicating the direction of movement of the plunger die 6 in shaping the glass, or must be outwardly inclined, that is, converging toward a point on the side of the convex surface of the lens. Such surfaces could not be undercut since then it would be impossible to remove the plunger die 6 after the pressing operation.

Figure 5:
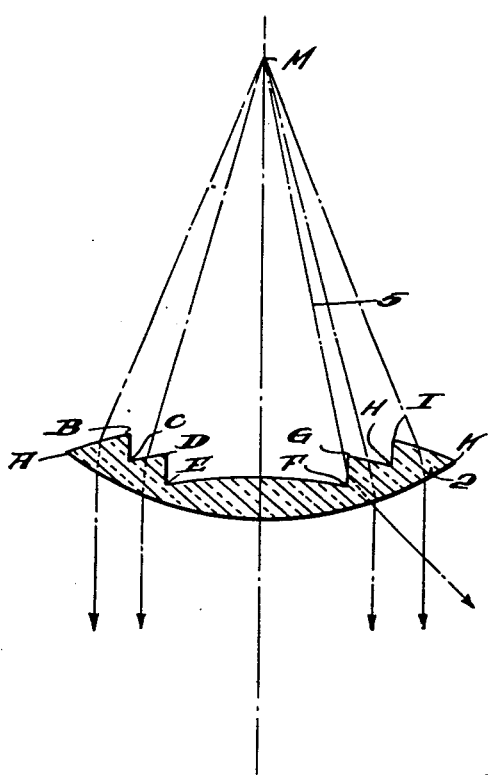
Fig. 5 shows diagrammatically the light path in the ordinary stepped lens produced in the manner shown in Fig. 1.

The disadvantage of a lens of this type is shown in Fig. 5. Assuming that light comes from the focus M of the lens, some of this light will strike the step-connecting surfaces, such as the surface GF. This is indicated by the arrow 5 in Fig. 5. This light will be refracted outwardly and will be lost. Obviously the greater the relative aperture of the lens the greater will be the amount of light so lost, since a greater proportion of the light will strike the step-connecting surfaces.

Figure 6:
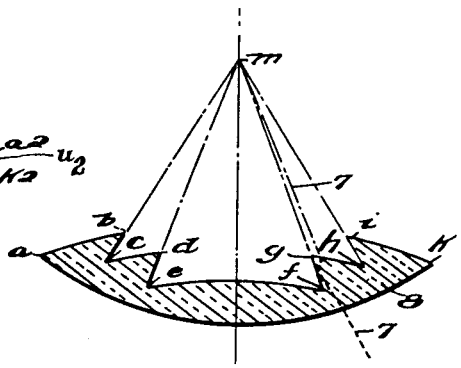
Fig. 6 shows diagrammatically the path of light through a lens embodying one form of the invention.

According to the invention this loss of light is avoided by making the step-connecting surfaces radial to the main focus of the lens. As shown in Fig. 6, for example, step-connecting surfaces bc, de, gf, and ih of lens 8 all point towards or are radial to the same point m which is the lens focus. Obviously, no light will strike these surfaces so that they are optically inactive, and therefore no light will be lost through outward refraction from the step-connecting surfaces. In the case of a circular lens, these surfaces will of course represent conical surfaces of which the focus m is the apex. The surfaces must of course be inwardly inclined.

The production of such a lens by the method shown in Fig. 1 would be impossible, since after the molding the plunger die could not be removed from the lens. In order to produce a lens, therefore, the method shown in Figs. 3, 13 and 14 is utilized.

Figure 2:
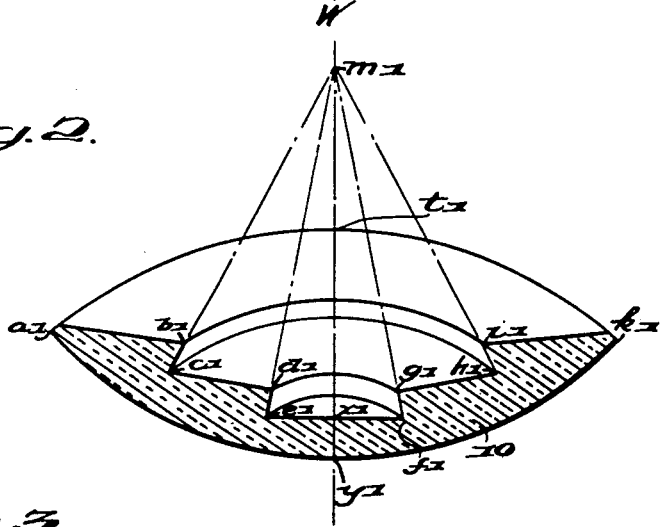
Fig. 2 shows, in perspective and partly in cross section, a lens produced according to the invention.
Figure 3:
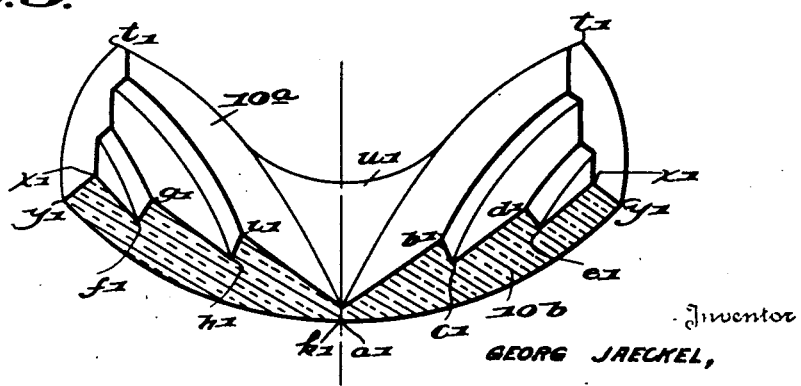
Fig. 3 shows, in perspective and partly in cross section, a blank used for making the lens disclosed in Fig. 2.

Assuming that the lens 10 is to have the form shown in Fig. 2, in which the step-connecting surfaces are radial to the focus $m_1$, a block is molded in the form shown in Fig. 3, the block there being shown in perspective, and partly in section, for producing a circular stepped lens. The outer points $a_1$ and $k_1$ of the lens of Fig. 2 are shown at the center of Fig. 3, dividing the same into two parts $10a$ and $10b$, while the central plane $t_1$, $x_1$, $y_1$ of Fig. 2 is shown at the outside of Fig. 3. When so molded it will be evident that steps $g_1f_1$, $i_1h_1$, $b_1c_1$, and $d_1e_1$, are all faced outwardly, that is to say, they are not undercut, and converge towards points on the side of the concave surface of the lens. The step surfaces descend towards the outside of the body of Fig. 3, whereas in the lens to be formed such surfaces descend towards the center. Obviously a body of the type shown in Fig. 3 can be produced without difficulty by the molding and pressing operation of the type shown in Fig. 1. The die plunger may be lifted after the pressing without difficulty.

The two halves connected at $k_1$, $a_1$ may be for convenience in manufacture further connected by a web $u_1$.

After the body of the type shown in Fig. 3 is molded and pressed, it is broken along the line $k_1$, $a_1$ and through the web $u_1$. The surfaces $t_1$, $x_1$, $y_1$ at opposite sides of the mold are then located opposite each other and fused together, thus producing the lens 10 shown in Fig. 2. The web $u_1$ may then be ground off from the lens.

Figure 4:
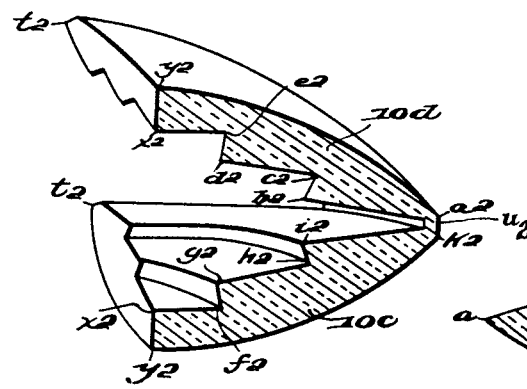
Fig. 4 shows similarly a modified form of blank.

In the modification shown in Fig. 4, the lens block with its surface $x_2$, $f_2$, $g_2$, $h_2$, $i_2$, $k_2$, $b_2$, $c_2$, $d_2$, $e_2$, $x_2$, $y_2$, $a_2$, $k_2$, $y_2$, is molded in the shape shown therein, having two parts $10c$ and $10d$. In this form it will be noted again that there are no undercut surfaces, and that the step-connecting surfaces converge towards points on the side of the concave surface, so that the plunger may be easily removed after the pressing operation. The two parts $10c$ and $10d$ are then separated by breaking the portion $a_2$, $k_2$, and the surfaces $t_2$, $x_2$, $y_2$ are brought together and fused, producing a lens similar to that of Fig. 2.

While in Fig. 3 the breaking on line $k_1$, $a_1$ produces lines of breakage on both the upper and lower surfaces of the lens, the structure of Fig. 4 requires breakage only through the connecting web $u_2$ which may then be ground off, or used to support the lens during further grinding.

The form of the invention shown in Fig. 6, while a decided improvement over the type of lens shown in Fig. 5, still has a certain disadvantage. Certain rays of light, as for instance indicated by the line 7, may strike the steps such as $gh$ and will be refracted against the surface $gf$. Obviously reflection or further refraction at this surface will cause such light rays to be lost.

Figure 7:
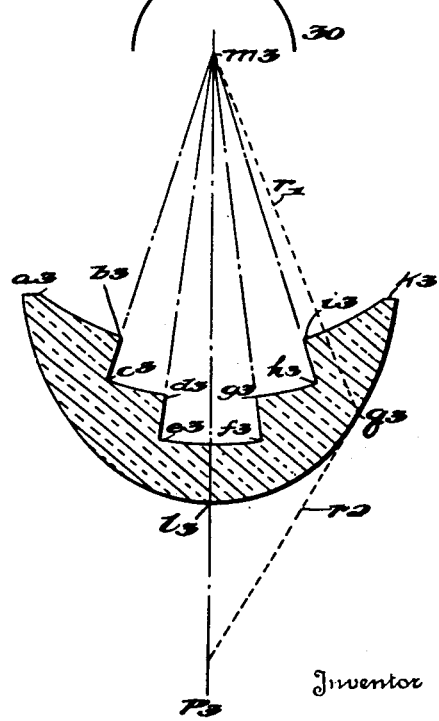
Fig. 7 shows the path of light through a lens embodying a preferred form of the invention.

In order to avoid this difficulty, the form of the invention shown in Fig. 7 is utilized. In this, the steps $a_3b_3$, $c_3d_3$, $e_3f_3$, $g_3h_3$, and $i_3k_3$ are all formed as arcs of circles about the principal focus $m_3$ as a center. In the case of a round lens of course these surfaces would be spherical. Therefore, no light strikes the step-connecting surfaces $b_3c_3$, $d_3e_3$, $g_3f_3$ and $i_3h_3$, which are radial with respect to focus $m_3$, directly; nor is any light refracted from the steps against these step-connecting surfaces. Thus all of the light passes through the lens and is refracted towards the conjugate focus $p_3$.

Another great advantage of this arrangement is that only the lower surface $a_3$, $l_3$, $k_3$, that is, the convex surface, need be calculated. The upper surface may be treated for optical purposes as if the lens body were solid clear back to the focus $m_3$, since no refraction or reflection will occur at the steps or step-connecting surfaces.

If it is desired to utilize all of the light, a spherical or cylindrical reflector 30 may be placed behind the focus $m_3$, with the focus as its center.

Figs. 7 and 8 show one mode of calculating the outer convex surface of a lens of this type. $m_3$ and $p_3$ represent the principal and conjugate foci respectively. $l_3$ represents the desired position of the apex of the lens, on the line $m_3$, $p_3$. In order to obtain a focus at $p_3$, all that is necessary is that the optical paths from $m_3$ to $p_3$ of different rays starting from $m_3$ should all be equal. Assuming the distances from $m_3$ and $p_3$ to any point $q_3$ on the convex surface to be $r_1$ and $r_2$, respectively, the light path has a length $$\nu r_1 + r_2$$

where $\nu$ is the index of refraction of the glass.

To ensure this, or, in other words, to locate points such that $$\nu r_1 + r_2$$

will be constant for all of them, with $m_3$ as a center, circles 40, 41, 42 and 43 are drawn, circle 40 having the radius $m_3$, $l_3$, (indicated as $\alpha$), and the succeeding circles being of decreasing diameter, the difference in diameter between successive circles being represented by $\mu$.

With $p_3$ as a center and $p_3$, $l_3$ (indicated as $\beta$) as a radius, a circle 50 is drawn. Further successive circles 51, 52, and 53 are drawn about $p_3$ as a center, the radii of these circles progressively increasing by the amount $t$ or $\mu\nu$ ($\nu$ again being the refractive index of the glass).

The points 61, 62 and 63 representing the intersection of circles 41, 42, and 43 with circles 51, 52, and 53 respectively, define the convex surface of the lens necessary to concentrate all of the rays at the point $p_3$.

As has been stated, the requirement for concentration of the rays at $p_3$ is that the optical paths should be of equal length. Considering the different points 61, 62 and 63, and representing for any point the number of its circle by $x$, the distance $r_1$ from point $m_3$ to such point $x$ is:

$$r_1 = \alpha - x\mu$$

Similarly, the distance of this point from the point $p_3$ $$r_2 = \beta + xt = \beta + x\mu\nu$$

The sum is therefore as follows:

$$\nu r_1 + r_2 = \nu\alpha - x\mu\nu + \beta - x\mu\nu = \nu\alpha + \beta$$

which is of course a constant since $\alpha$, $\beta$ and $\nu$ are all constants.

The concave surface of the lens, that is, the surface facing the light source or principal focus $m_3$, should be in the form of a spherical surface or a series of the concentric spherical surfaces having the focus $m_3$ as the center. The convex surface should be terminated naturally at the point where total internal reflection occurs. In the case of a lens formed of a glass having an index of refraction of 1.52, this total reflection occurs when the angle $m_363u_3$ ($u_3$ lying on the prolongation of the line $p_363$) is 49°.

Before this point is reached, however, there will be a considerable loss by reflection, and it is desirable to limit the angle $m_363u_3$ to 30° or 35°.

Where the production of a virtual conjugate focus instead of a real conjugate focus is desired, $p_3$ will of course be on the same side of $l_3$ as $m_3$. In this case, the circles 50, 51, 52, 53 are made with a radius $$r_2 = \beta - x\mu\nu$$

For such a focus of course the condition must be that $$\nu r_1 - r_2$$

must be a constant. The formula then becomes:

$$\nu r_1 - r_2 = \nu a - x\mu\nu - \beta + x\nu\mu = \nu a - \beta = \text{constant}$$

Where the lens is to emit parallel rays, $r_2$ is infinite and the equation of the convex surface becomes that of an ellipse in which $r_2$ is calculated as the distance from each point on the convex surface to a plane through $l_3$ and perpendicular to the lens axis $m_3l_3$.

Figs. 13 and 14 show the manner in which the mold for producing the lens of the type shown in Fig. 7 is made. The desired shape of lens is represented in Fig. 13 by the white space between the mold parts. The bottom mold section is formed in two parts 12, 14, $l_4$, 16, 18 and 20, 22, $l_4$, 16, 24, respectively, said parts being substantially symmetrical and separated along the line $l_4$, 16. The surface 14, $l_4$, 22 has the shape of the convex side of the lens which is desired.

The plunger die is also produced in two parts $a_4$, 24, 26 and $k_4$, 24, 26. These two parts are separated along the line 24, 26. The surface of the plunger corresponds to that desired for the inside or concave surface of the lens to be produced.

It will be noted that surfaces 12, 14; $a_4$, 26; 26, $k_4$ and 22, 20 are straight, and that they are in a straight line in the production of the mold of Fig. 13. Surfaces 12, 14 and 22, 20 are then secured together, to produce the lower mold part 16, $l_4$, 22, 14, $l_4$, 16, 18, 12, 20, 24 shown in Fig. 14. For the plunger die part, sections $a_4$, 24, 26 and $k_4$, 24, 26 are turned to bring surfaces $a_4$, 26 and 26, $k_4$ opposite each other, and are thus secured to produce the plunger die 24, 26, 24, $k_4$, $a_4$, shown in Fig. 14.

By pressing glass with the mold bottom and plunger die shown in Fig. 14, a lens body $l_4$, 24, $a_4$, $k_4$, 24, $l_4$, 14, 22 is produced. This lens body is then broken along the line $a_4$, $k_4$—14, 22, and surfaces $l_4$, 24 and 24, $l_4$ are joined together. The final lens body is substantially similar to that shown in Fig. 7, in its characteristics.

If it is desired to use a lens arrangement which will embrace a 90° angle, it is necessary to use a plurality of lenses. For example, three lenses each having a maximum refractive angle of 30° may be utilized. Such a system is shown in Fig. 9.

In the construction shown in this figure, $m_4$ is the principal focus. The inner lens 91 has an angular extent of 180° around the point $m_4$, but its greatest refracting power is 30°. The outer surface is formed so as to provide a virtual conjugate focus $m_{41}$, with the angle $m_4t_4m_{41} = 30°$. All light projected in any downward direction from the point $m_4$ therefore emanates from the outer surface of the lens along lines radial to the conjugate focus $m_{41}$.

The second or intermediate lens 92 is of sufficient angular extent to receive all light emanating from the first lens 91, or in other words, about the conjugate focus $m_{41}$ of the first lens its angular extent is 120°. The point $m_{41}$ is taken as the main focus of the second lens 92 and this lens has a virtual conjugate focus $m_{42}$, the angle $m_{41}u_4m_{42}$ being also 30°.

The third or outer lens 93 has the conjugate focus $m_{42}$ of the second lens as its principal focus. It has an angular extent of 60° with respect to the principal focus.

It is obvious that all light reflected in any downward direction from the focus $m_4$ will, in the manner shown by the dot and dash lines in the drawings, emanate in parallel rays from the outer lens 93.

Figure 10:
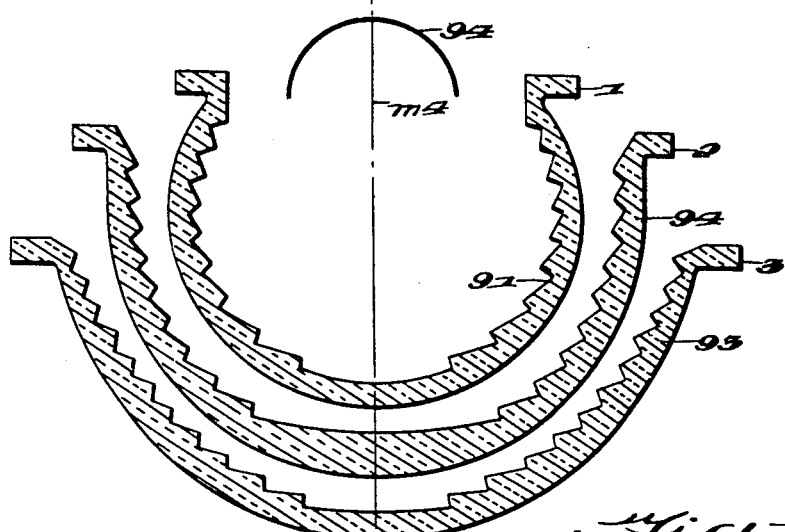
Fig. 10 shows a modification thereof.

If it is desired to utilize all of the light from the point $m_4$, the arrangement shown in Fig. 10 may be utilized, the lens system being the same as in Fig. 9. The only difference is that a semicylindrical or hemispherical reflector 94 is provided behind the light source $m_4$ with such source as its center, so as to reflect all rays back through the light source.

A lens system of the type shown in Figs. 9 and 10 is particularly adapted for use as a condenser for projection and motion picture work, and for signalling work. In contrast with prior stepped lenses, it produces an uninterrupted beam of light since none of the steps interfere with the light transmission. The light is also more uniform and agreeable.

Figure 11:
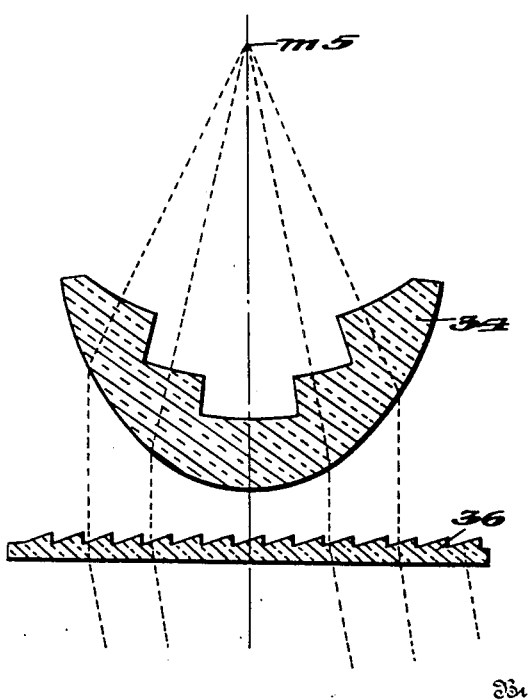
Fig. 11 shows still a different lens system utilizing a lens produced according to the invention.

When a lens embodying the invention is to be used for signalling purposes, it may also be provided with a refracting disc as shown in Fig. 11. Here the light source $m_5$ and the stepped lens 34 are provided with a refracting disc 36 in front of the lens.

Figure 12:
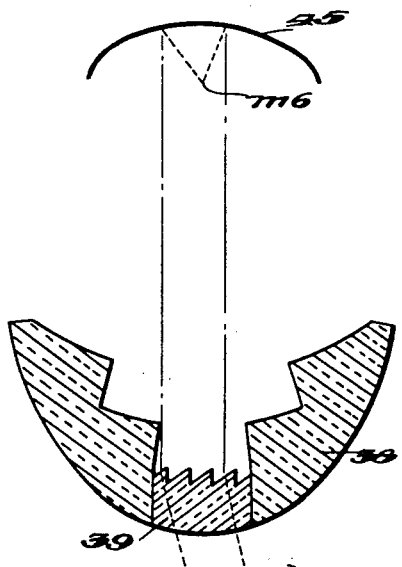
Fig. 12 shows a modification for producing the effects of the device shown in Fig. 11.

Instead, however, of providing such a refracting disc, it is possible to embody it directly in the lens body. For example, as shown in Fig. 12, the central portion of the lens 38 may be replaced by a refracting section 39. In this case the light source $m_6$ is provided with a parabolic reflector 45 to reflect all rays in parallel relation to the lens and refracting portion.

Fig. 15 shows the procedure for manufacturing a lens for ships' lanterns, for example, of the annular type. Such lens is not formed as a surface of revolution about the central path of the light, but as a surface produced by the displacement of a surface of the cross section shown for example in Fig. 7, either in a straight line or in a circle.

Such annular lenses can be produced in the manner shown in Fig. 15. The lens is produced in the two separate, identical parts shown in the figure, and divided therein by the line 76—77. Obviously either the lower half or the upper half of the lens may be molded without difficulty, as there are no undercut steps during the molding. The connecting portions 71, 72, 73, 74 may be broken out after the parts are formed. The portions 10e, 10f are then connected along the line 76—77, and the lens is completed.

While I have described herein some embodiments of my invention, I wish it to be understood that I do not intend to limit myself thereby except within the scope of the appended claims.

What I claim is:

1. A concavo-convex lens having steps on the concave side, the surfaces of the steps in cross section forming arcs of circles about a common center, and step-connecting surfaces in cross section all radial to said center.

2. A concavo-convex lens having steps on the concave side, the surfaces of the steps being spherical about a common center, and step-connecting surfaces all being conical with their apices at said center.

3. A concavo-convex lens having steps on the concave side, the surfaces of all the steps being arcuate and having the main focus of the lens as a center, and step-connecting surfaces all radial to said main focus, the convex surface of said lens having each point thereof at distances $\alpha-\mu x$ and $\beta \pm \mu\nu x$ from the main focus and the conjugate focus respectively, wherein $\alpha$ and $\beta$ are the distances from the main and conjugate foci respectively to the apex of the convex side of the lens, $\nu$ is the refractive index, $\mu$ is a constant and $x$ is any number.

4. A concavo-convex lens having steps on the concave side, the surfaces of all the steps being spherical and having the main focus of the lens as a center, step-connecting surfaces all being conical and having said main focus as an apex, the convex surface of said lens having each point thereof at distances $\alpha-\mu x$ and $\beta \pm \mu\nu x$ from the main focus and the conjugate focus respectively wherein $\alpha$ and $\beta$ are the distances from the main and conjugate foci respectively to the apex of the convex side of the lens, $\nu$ is the refractive index, $\mu$ is a constant and $x$ is any number.

5. A concavo-convex lens having steps on the concave side, the surfaces of all the steps being arcuate and having the main focus of the lens as a center, the convex surface of said lens having each point thereof at distances $\alpha-\mu x$ and $\beta \pm \mu\nu x$ from the main focus and the conjugate focus respectively, wherein $\alpha$ and $\beta$ are the distances from the main and conjugate foci respectively to the apex of the convex side of the lens, $\nu$ is the refractive index, $\mu$ is a constant and $x$ is any number.

6. A lens system comprising a series of concavo-convex lenses each having steps on the concave side, the surfaces of the steps of each lens in cross section forming arcs of circles about a common center, and step-connecting surfaces on each lens in cross section all radial to said center, the first lens having its conjugate focus on the opposite side of the main focus from the lens apex, each successive lens in the series having its main focus at the conjugate focus of the preceding lens.

7. A lens system comprising a series of concavo-convex lenses each having steps on the concave side, the surfaces of the steps of each lens in cross section forming arcs of circles about a common center, and step-connecting surfaces on each lens in cross section all radial to said center, the inner lens having its conjugate focus on the opposite side of the main focus from the lens apex, each successive lens in the series having its main focus at the conjugate focus of the preceding lens and its conjugate focus on the opposite side of its main focus from the apex of the first lens.

8. A lens system comprising a series of concavo-convex lenses each having steps on the concave side, the surfaces of the steps of each lens in cross section forming arcs of circles about a common center, and step-connecting surfaces on each lens in cross section all radial to said center, the inner lens having its conjugate focus on the opposite side of the main focus from the lens apex, each successive lens in the series having its main focus at the conjugate focus of the preceding lens and its conjugate focus on the opposite side of its main focus from the apex of the first lens, the outer lens having its conjugate focus at infinity.

9. A lens system comprising three concavo-convex lenses each having steps on the concave side, the surface of the steps of each lens being arcuate and having the main focus of the lens as a center, and step-connecting surfaces on each lens all radial to said main focus, the convex surface of each lens having each point thereof at distances $\alpha-\mu x$ and $\beta \pm \mu\nu x$ from the main focus and the conjugate focus thereof respectively, wherein $\alpha$ and $\beta$ are the distances from the main and conjugate foci respectively to the apex of the convex side of the lens, $\nu$ is the refractive index, $\mu$ is a constant and $x$ is any number arranged one within the other, the inner lens having its conjugate focus on the opposite side of the principal focus from the lens apex, the intermediate lens having its principal focus at the conjugate focus of the first lens and its conjugate focus on the opposite side of its principal focus from the apex of the first lens, the outer lens having its principal focus at the conjugate focus of the second lens.

10. A lens system comprising three concavo-convex lenses each having steps on the concave side, the surface of the steps of each lens being arcuate and having the main focus of the lens as a center, and step-connecting surfaces on each lens all radial to said main focus, the convex surface of each lens having each point thereof at distances $\alpha-\mu x$ and $\beta \pm \mu\nu x$ from the main focus and the conjugate focus thereof respectively, wherein $\alpha$ and $\beta$ are the distances from the main and conjugate foci respectively to the apex of the convex side of the lens, $\nu$ is the refractive index, $\mu$ is a constant and $x$ is any number arranged one within the other, the inner lens having its conjugate focus on the opposite side of the principal focus from the lens apex, the intermediate lens having its principal focus at the conjugate focus of the first lens and its conjugate focus on the opposite side of its principal focus from the apex of the first lens, the outer lens having its principal focus at the conjugate focus of the second lens and its conjugate focus at infinity.

GEORG JAECKEL.